(12) United States Patent
Jangbarwala (10) Patent No.: US 6,998,044 B2
(45) Date of Patent: Feb. 14, 2006

(54) ELECTROPHORETIC CROSS-FLOW FILTRATION AND ELECTRODEIONIZATION: METHOD FOR TREATING EFFLUENT WASTE AND APPARATUS FOR USE THEREWITH

(75) Inventor: Juzer Jangbarwala, Chino Hill, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 128 days.

(21) Appl. No.: 10/380,581

(22) PCT Filed: Sep. 14, 2001

(86) PCT No.: PCT/US01/28737

§ 371 (c)(1),
(2), (4) Date: May 5, 2003

(87) PCT Pub. No.: WO02/22511

PCT Pub. Date: Mar. 21, 2002

(65) Prior Publication Data

US 2003/0213748 A1      Nov. 20, 2003

Related U.S. Application Data

(60) Provisional application No. 60/232,548, filed on Sep. 14, 2000.

(51) Int. Cl.
*B01D 61/48*      (2006.01)

(52) U.S. Cl. ............... 210/243; 204/633; 204/637; 204/638; 204/640; 210/266; 210/283; 210/284

(58) Field of Classification Search ............... 210/243, 210/259, 264, 266, 295, 321.78, 321.87, 210/638, 639, 650–652, 669, 670, 748, 805, 210/806, 283, 284; 204/524–533, 630–640
See application file for complete search history.

(56) References Cited

U.S. PATENT DOCUMENTS

| | | | | |
|---|---|---|---|---|
| 2,815,320 A | * | 12/1957 | Kollsman | 204/524 |
| 2,854,394 A | * | 9/1958 | Kollsman | 204/524 |
| 3,149,061 A | * | 9/1964 | Parsi | 204/517 |

(Continued)

*Primary Examiner*—Joseph Drodge
(74) *Attorney, Agent, or Firm*—David A. Hey (57) ABSTRACT

The present invention provides a method and apparatus for purifying effluent wastewater utilizing electrophoretic cross-flow filtration and electrodeionization. The method first comprises filtering the water in a cross-flow direction with a filter membrane (120) in the presence of an electric field that is operative to drive suspended particles away from a surface of the filter membrane (120). The permeate (134) containing dissolved solids is next passed through a mixture (188) of at least one cation-exchange resin and at least one anion-exchange resin disposed between a cation-selective membrane (184) and an anion-selective membrane (181) in the presence of an electric field. The electric field drives cations in the permeate through the cation-selective membrane (184), and drives anions in the permeate through the anion-selective membrane (181), thereby to form deionized water (192). The apparatus includes cell modules adapted to be used in plate-and-frame or radial flow configurations.

11 Claims, 6 Drawing Sheets

U.S. PATENT DOCUMENTS

| | | | |
|---|---|---|---|
| 3,905,886 A * | 9/1975 | Wang | 204/532 |
| 4,032,452 A | 6/1977 | Davis | |
| 4,165,273 A | 8/1979 | Azarov et al. | |
| 4,676,908 A * | 6/1987 | Ciepiela et al. | 210/638 |
| 4,804,451 A * | 2/1989 | Palmer | 204/633 |
| 5,061,376 A | 10/1991 | MacGregor | |
| 5,512,173 A | 4/1996 | Uchino et al. | |
| 5,951,874 A * | 9/1999 | Jangbarwala et al. | 210/662 |
| 6,056,878 A * | 5/2000 | Tessier et al. | 210/639 |
| 6,274,018 B1 * | 8/2001 | Hidaka | 204/524 |

* cited by examiner

ELECTROPHORETIC CROSS-FLOW FILTRATION AND ELECTRODEIONIZATION: METHOD FOR TREATING EFFLUENT WASTE AND APPARATUS FOR USE THEREWITH

CROSS-REFERENCE TO RELATED APPLICATIONS

This application claims the benefit of U.S. Provisional Application No. 60/232,548, filed Sep. 14, 2000.

FIELD OF THE INVENTION

The present invention generally relates to the removal and collection of undesirable wastes from a waste stream, such as those produced as byproducts of industrial processes. More particularly, the present invention is directed to the purification of an effluent waste stream containing suspended and dissolved solids, such as metal salts. Specifically, the present invention relates to a method and apparatus useful in removing suspended and dissolved solids from a solution that contains such waste products, thereby to yield a purified water output.

BACKGROUND OF THE INVENTION

Various industrial processes, such as semi-conductor fabrication, generate wastewater having high concentrations of suspended and dissolved solids. Such wastewater can be highly toxic, and accordingly must be purified prior to being sent to municipal wastewater treatment plants.

An industrial process known as Chemical Mechanical Planerization or polishing, (CMP) is one for which purification of the wastewater stream is of particular interest. CMP, which can be used in the fabrication of integrated circuits having copper interconnects, removes excess copper by a hybrid process where copper is polished off the semiconductor wafer by a combination of chemical etching and physical polishing by fine aluminum oxide slurry. The particle size distribution of the slurry ranges generally from 0.02 micron (200 Angstroms) to 0.10 micron (1000 Angstroms). The rinsewater wastes contain variable amounts of dissolved copper salts in addition to the suspended solids of the slurry.

Purification of the rinsewater from CMP processes presents a significant challenge for waste disposal efforts. It is desirable to remove the suspended and dissolved solids from the CMP rinsewater stream. However, the solids present in the rinsewater can plug the flow path of conventional purification systems, such as filter membranes and ion-exchange resin columns, thus making such processes for removing wastes from the CMP rinsewater highly inefficient. Further, conventional ion-exchange resins can be irreversibly damaged by oxidizers that are commonly present in CMP rinsewater. While activated carbon is often used to eliminate oxidizers from waste streams, the pores of activated carbon particles are susceptible to plugging in CMP rinsewater due to the particle size distribution of the CMP slurry waste. Additionally, the use of conventional ion-exchange resin technology requires intermittent interruption of the purification process for regeneration of the resin, thereby decreasing the efficiency of the process.

Accordingly, there remains a need to provide a new and improved method of purifying wastewater streams containing both suspended and dissolved solids, and CMP slurry in particular. There is a further need for methodologies for purifying and recycling the wastewater from industrial chemical processes. Additionally, there is a need for a new and useful apparatus for use with the methods of the present invention for the treatment and processing of water containing suspended and dissolved solids, such as the wastewater from copper CMP manufacturing processes. The present invention is directed to meeting these needs.

SUMMARY OF THE INVENTION

It is an object of the present invention to provide a new and useful method for removing suspended and dissolved solids from waste generated by industrial processes.

It is another object of the present invention to provide an efficient method for filtering suspended solids and removing dissolved salts from a wastewater stream.

It is yet another object to provide a new and useful apparatus operative to efficiently purify water generated by industrial fabrication processes.

A still further object is to provide a method and apparatus for purifying wastewater that does not require intermittent interruption of the purification process.

According to the present invention then, a method is provided for purifying water that contains suspended and dissolved solids. The method first comprises filtering the water in a cross-flow direction with a filter membrane in the presence of an electric field that is operative to drive suspended particles away from a surface of the filter membrane. The filter membrane is operative to retain a majority of the suspended solids thereby to form a retentate containing suspended solids, and to pass at least some of the dissolved solids thereby to form a permeate containing dissolved solids. The method next comprises passing the permeate through a mixture of at least one cation-exchange resin and at least one anion-exchange resin disposed between a cation-selective membrane and an anion-selective membrane in the presence of an electric field. The electric field is operative to drive a majority of cations in the permeate through the cation-selective membrane, and to drive a majority of anions in the permeate through the anion-selective membrane, thereby to form deionized water. The method may further include collecting the retentate and the cations and anions for disposal.

The present invention also provides an apparatus for use in purifying water that contains suspended and dissolved solids. The apparatus comprises a retentate chamber sized and adapted to receive a selected volume of fluid, wherein the retentate chamber includes an inlet adapted to be placed in fluid communication with a source of the water that contains suspended and dissolved solids; a permeate chamber adjacent the retentate chamber and sized and adapted to receive a selected volume of fluid; a filter membrane interposed between the retentate chamber and the permeate chamber, wherein the filter membrane is operative when the inlet is in fluid communication with the source to retain in the retentate chamber a majority of the suspended solids thereby to form in the retentate chamber a retentate containing suspended solids, and to pass to the permeate chamber at least some of the dissolved solids thereby to form in the permeate chamber a permeate containing dissolved solids; a diluting chamber sized and adapted to receive a selected volume of the permeate, wherein the diluting chamber includes a mixture of at least one cation exchange resin and at least one anion exchange resin disposed therein; a first conduit interconnecting the permeate chamber and the diluting chamber and operative to establish fluid communication therebetween; an outlet communicating with the diluting chamber and operative to receive deionized water therefrom; a cation concentrating chamber adjacent the diluting chamber; a cation-selective membrane interposed between the diluting chamber and the cation-concentrating chamber, wherein the cation-selective membrane is operative to retain anions in the diluting chamber and to pass cations into the cation-concentrating chamber; an anion-concentrating chamber adjacent the diluting chamber; an anion-selective membrane interposed between the diluting chamber and the anion-concentrating chamber, wherein the anion-selective membrane is operative to retain cations in the diluting chamber and to pass anions into the anion-concentrating chamber; a second conduit communicating with at least one of the retentate chamber, cation-concentrating chamber and anion-concentrating chamber and adapted to receive the suspended and dissolved solids therefrom; and at least one cathode and anode operative to create an electric field across the retentate chamber, permeate chamber, diluting chamber, cation-concentrating chamber and anion-concentrating chamber.

The chambers may be formed by a plurality of alternating membranes and spacers, such as gasketed monofilament screen spacers. The alternating membranes and spacers may be sandwiched between an input endplate and an output endplate, where the input and output endplates each include an electrode adapted to be placed in electrical communication with an electrical current source. In particular, the diluting chamber may be defined by a spacer sandwiched between the anion-selective membrane and the cation-selective membrane, while the retentate chamber and permeate chamber may each be defined by a spacer sandwiched between the filter membrane and a cation-selective membrane, and the cation-concentrating chamber and the anion-concentrating chamber may be each defined by a spacer sandwiched between a cation-selective membrane and an anion-selective membrane.

In an alternative embodiment, the anode, cathode, filter membrane, cation-selective membrane and anion-selective membrane may be configured as concentric cylinders, where the apparatus further includes a second anode disposed along a longitudinal axis of the cylinders. The filter membrane may be disposed radially inwardly from the anode thereby to define the retentate chamber therebetween; the cathode may be disposed radially inwardly from the filter membrane thereby to define the permeate chamber therebetween; the cation-selective membrane may be disposed radially inwardly from the cathode thereby to define the cation-concentrating chamber therebetween; and the anion-selective membrane may be disposed radially between the cation-selective membrane and the second anode thereby to define the diluting chamber between the anion-selective membrane and the cation-selective membrane and to define the anion-concentrating chamber between the anion-selective membrane and the second anode.

The present invention also provides a system for use in purifying water that contains suspended and dissolved solids, as well as a cell module for use in an apparatus or system according to the present invention.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention provides a method and apparatus for purifying effluent waste from industrial processes, such as Chemical Mechanical Planerization or polishing (CMP) processes used in various industries, including semi-conductor manufacturing. The effluent waste from such industrial processes may contain high concentrations of dissolved and suspended solids. For example, effluent from CMP processes may contain approximately 500–5000 parts per million (ppm) of suspended solids and 5–250 ppm copper (II) ion. Current environmental regulations require that the effluent be reduced to less than 5 ppm suspended solids and 0.1–2 ppm copper before it may be discharged into a waste treatment system. A single semi-conductor fabrication plant may produce 200 gallons per minute of CMP effluent from copper and other CMP processes, such that the purification of the wastewater streams from such plants is a significant endeavor. Accordingly, it is important to provide an efficient and economical method for purifying effluent from such plants that is able to meet the required regulatory standards.

Toward that end, the present invention provides an apparatus incorporating electrophoretic cross-flow membrane filtration technology combined with electrodeionization technology. In particular, the apparatus includes one or more electrophoretic electrodeionization cells for removing suspended and dissolved solids from a wastewater stream passing therethrough. The present invention is especially advantageous in its ability to remove suspended solids without these solids excessively blocking or plugging the filter membranes. Additionally, the present invention does not require intermittent interruption in the purification process for regeneration procedures, as might be required with conventional ion-exchange resin processes for removing dissolved solids, for example. Further, the apparatus, according to the present invention may be modified to accommodate the desired flow rate of effluent to be treated. In particular, a greater or lesser number of electrophoretic electrodeionization cells may be incorporated into the apparatus to accommodate a given flow rate of effluent therethrough, as well as to accommodate various concentrations of solids therein.

Various technologies have been developed for purifying rinsewater waste streams. In particular, cross-flow membrane filtration and electrophoretic cross-flow membrane filtration technologies have been developed to address the problems associated with removing suspended solids from a solution. Electrodeionization technologies have been developed for removing dissolved solids, such as various metal salts, from a solution.

Figure 1:
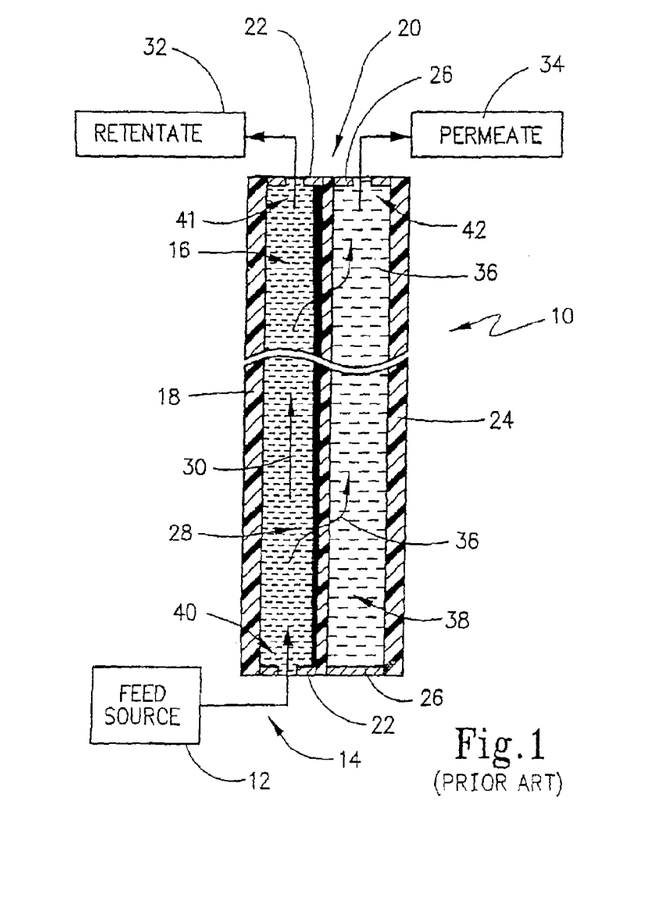
FIG. 1 is a diagrammatic cross-sectional view of a prior art cross-flow filtration cell.

Turning to FIG. 1, it can be seen that a cross-flow filtration cell 10 includes an inlet chamber 16 defined on one side by a membrane 18, such as a dialyzing cellophane membrane, and on an opposite side by a filter 20, such as an 0.8 $\mu$m porosity microfilter, an ultrafilter or other appropriate filter for a selected particulate size distribution. Outlet chamber 38 lies on the opposite side of filter 20 from inlet chamber 16. Outlet chamber 38 is defined on one side by filter 20 and on an opposite side by another membrane 24, which may be a dialyzing membrane similar to membrane 18. Alternatively, supports as known in the art may be used in place of membranes 18 and 24. The remaining sides of inlet chamber 16 and outlet chamber 38 are respectively defined by a first spacer 22 disposed between membrane 18 and filter 20 and a second spacer 26 disposed between filter 20 and membrane 24. Spacers 22 and 26 may be gasketed monofilament screen spacers as known in the art.

As shown in FIG. 1, a feed source 12 provides a solution 14 having suspended solids therein through an inlet aperture 40 in spacer 22. Solution 14 is passed into inlet chamber 16 and passes in a cross-flow direction to filter 20. This method of cross-flow filtration of solution 14 reduces filter membrane fouling by reducing build up of filter cake 28, by continuously sweeping the filter membrane surface in the direction of flow of solution 14, shown by arrow 30.

A retentate 32 and permeate 34 are thus formed. In particular, retentate 32 contains particles having a particle size greater than the pore size of filter membrane 20, and that accordingly do not pass therethrough. An appropriate filter membrane 20 may be chosen to retain suspended solids of a selected particle size distribution, as appropriate for a given application. Permeate 34 includes particles having a particle size smaller than the pore size of filter membrane 20, such as dissolved metal salts. Filter membrane 20 is preferably a non-polar filter membrane that allows both cations and anions to permeate therethrough. The flow of solution 14 in the cross-flow direction 30 to filter membrane 20 extends the life of filter membrane 20 by reducing build-up of filter cake 28, and further helps to sustain the flow of permeate 34 therethrough to outlet chamber 38 as shown by arrows 36. Retentate 32 and permeate 34 flow through outlet apertures 41 and 42 in spacers 22 and 26, respectively, for collection.

Figure 2:
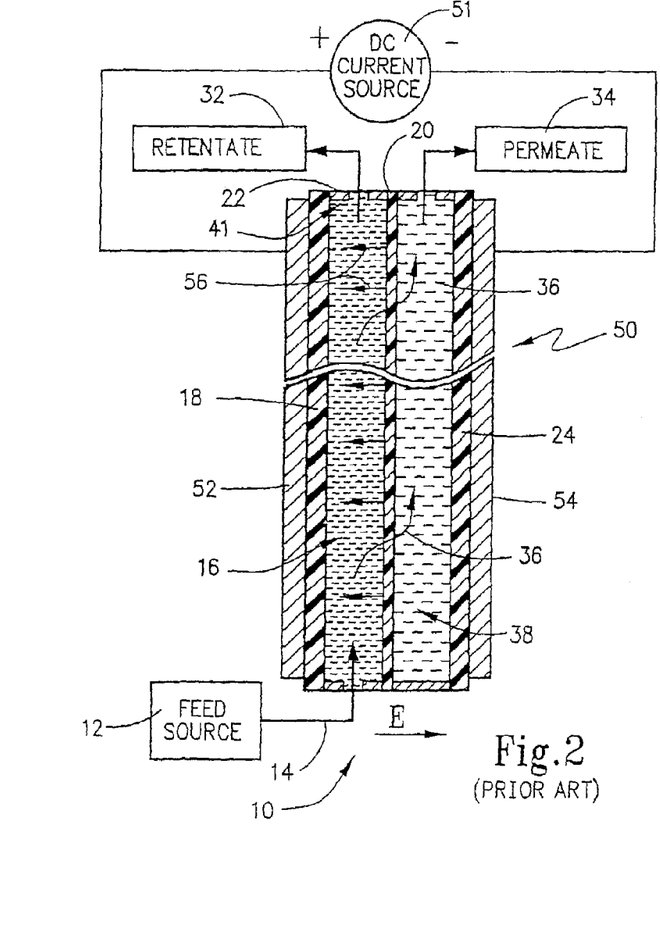
FIG. 2 is a diagrammatic cross-sectional view of a prior art electrophoretic cross-flow filtration cell

To further enhance the filtration of solutions having suspended solids therein, the technology of electrophoretic cross-flow membrane filtration was developed. As shown in FIG. 2, an anode 52 and a cathode 54 are disposed adjacent a cross-flow filtration cell 10, such as that shown in FIG. 1. Anode 52 and cathode 54 may be standard plate-type electrodes as known in the art. In an electrophoretic cross-flow membrane system 50 as shown in FIG. 2, a DC current source 51 in electrical communication with anode 52 and cathode 54 provides a DC current thereto, thereby to generate an electric field E across the cross-flow membrane filtration cell 10. While anode 52 and cathode 54 are diagrammatically shown placed immediately adjacent membranes 18 and 24, it should be appreciated that anode 52 and cathode 54 may be disposed in varying locations within a system, such as further distances from membranes 18 and 24, provided electric field E is generated therebetween by the positioning thereof. Such varying placement may permit the stacking of a plurality of cells 10 between anode 52 and cathode 54, thereby to form an electrophoretic filtration system comprising a plurality of cells disposed in electric field E.

Inlet chamber 16 is preferably positioned such that it is disposed between anode 52 and filter membrane 20. Outlet chamber 38 is preferably disposed between cathode 54 and filter membrane 20. In electrophoretic cross-flow membrane filtration system 50, electric field E enhances the cross-flow filtration process by electrophoretically driving particles away from the surface of filter membrane 20 in the direction of arrows 56, thereby to suppress formation of a filter cake and maintain the efficiency of filter membrane 20. That is, because the suspended solids in solution 14 provided by feed source 12 generally carry a negative charge, these particles electrophoretically migrate in the direction of anode 52, away from filter membrane 20, and opposite the general direction of flow of permeate 34 through filter 20 as shown by arrows 36. Suspended particles thus remain in retentate 32, which passes through outlet 41 of spacer 22. Retentate 32 containing the suspended solids can thereafter be disposed of by various methods as known in the art.

Electrodeionization technology combines electrodialysis and ion-exchange resin deionization technologies to remove dissolved salts from aqueous streams. In particular, an electric potential forces ions present in an aqueous feed stream that is sent through a diluting chamber into adjacent concentrating chambers. The use of ion-exchange resins in the diluting chamber allows for the efficient migration of ions. That is, the ion-exchange resins act as ion conduits for the transport of cations and anions to a cation concentrating chamber and an anion concentrating chamber, respectively.

A standard electrodeionization apparatus includes alternating layers of anion-selective and cation-selective membranes spaced within a plate-and-frame module, as known in the art, thereby to form parallel diluting and concentrating chambers. Anion-selective membranes are permeable to anions but not to cations or to water. Cation-selective membranes are permeable to cations but not to anions or to water.

Figure 3:
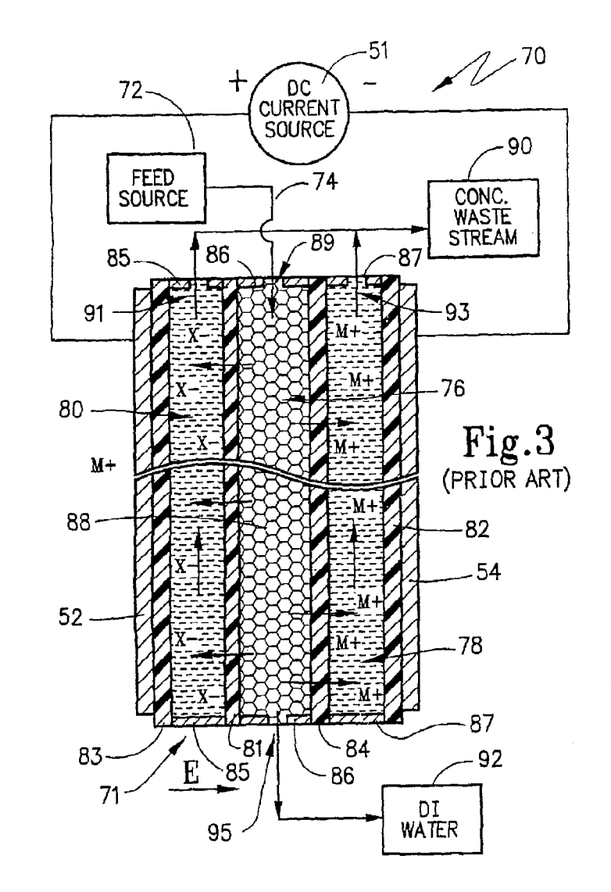
FIG. 3 is a diagrammatic cross-sectional view of a prior art electrodeionization cell.

In particular, as shown in FIG. 3, an electrodeionization system 70 utilizes one or more electrodeionization cells 71 disposed between an anode 52 and a cathode 54. Each cell 71 has a diluting chamber 76, a cation concentrating chamber 78 and an anion concentrating chamber 80. DC current source 51 provides a DC current to the electrodes, anode 52 and cathode 54 respectively, which operate under a DC voltage potential to generate an electric field E across cell 71. The cation concentrating chamber 78 is disposed between the diluting chamber 76 and the cathode 54, and is defined on the cathode side thereof by an anion-permeable membrane 82 and on the anode side thereof by a cation permeable membrane 84. The anion concentrating chamber 80 is similarly defined on the cathode side thereof by an anion-permeable membrane 81 and on the anode side thereof by a cation-permeable membrane 83. The diluting chamber 76 is disposed between the cation concentrating chamber 78 and the anion concentrating chamber 80 and is defined on the cathode side by cation-permeable membrane 84 and on the anode side by anion-permeable membrane 81. The anion-permeable and cation-permeable membranes may be fixed to thin inert polymer frames for support, as known in the art. The remaining sides of each chamber are defined by spacers 85, 86 and 87, respectively, such as gasketed monofilament screen spacers as known in the art. In particular, spacer 85 is sandwiched between cation-permeable membrane 83 and anion-permeable membrane 81 to define anion concentrating chamber 80. Spacer 86 is sandwiched between anion-permeable membrane 81 and cation-permeable membrane 84 to define diluting chamber 76. Spacer 87 is sandwiched between cation-permeable membrane 84 and anion-permeable membrane 82 to define cation concentrating chamber 78. Diluting chamber 76 is filled with a mixture of cation and anion exchange resins 88.

It can be seen that a feed source 72 provides a solution 74 containing metal salts, such as copper salts from a CMP rinsewater stream. Solution 74 is passed through an inlet aperture 89 in spacer 86 into diluting chamber 76 where it contacts the mixture of cation and anion exchange resins 88. The unwanted ions from the water are exchanged for either hydroxyl or hydrogen ions from the resins, and are then transported to the appropriate concentrating compartment in response to the electric field E. That is, the anion-exchange resins in mixture 88 exchange hydroxyl ions for the anions of the dissolved salts, and the cation-exchange resins in mixture 88 exchange hydrogen ions for the cations of the dissolved salts. The DC electrical potential of electrical field E drives the ions along the surfaces of the ion-exchange resins, which are generally formed in small particles such as beads, and through the membranes into the appropriate concentrating compartment. That is, cations, shown by M+, migrate toward cathode 54 through the cation-permeable membrane 84 that defines the cathode side of diluting chamber 76. The cations are trapped by the anion-permeable membrane 82 that defines the cathode side of cation concentrating chamber 78, thereby retaining the cations M+ in the cation concentrating chamber 78. Anions, shown by X−, migrate toward anode 52 through the anion-permeable membrane 81 that defines the anode side of diluting chamber 76. The anions are trapped by the cation-permeable membrane 83 that defines the anion side of anion concentrating chamber 80, thereby retaining the anions X− in the anion concentrating chamber 80. The concentrated anions and cations are then removed through outlet apertures 91 and 93 in spacers 85 and 87, respectively, as a concentrate waste stream 90. Deionized water 92, resulting from the removal of the undesired cations and anions of the dissolved salts from feed solution 74, is passed from diluting chamber 76 through outlet aperture 95 in spacer 86.

EDI technology takes advantage of a phenomenon wherein, under localized areas of high potential gradients from electrical field E, water is "split" into hydrogen ions ($H^+$) and hydroxyl ions ($OH^-$), which results in the constant regeneration of the ion-exchange resins 88 in diluting chamber 76. Because of this constant regeneration, it is unnecessary to interrupt the water purification process to add regenerative solutions, such as acid or base solutions, as is commonly required in traditional purification procedures utilizing ion-exchange resins.

Figure 4:
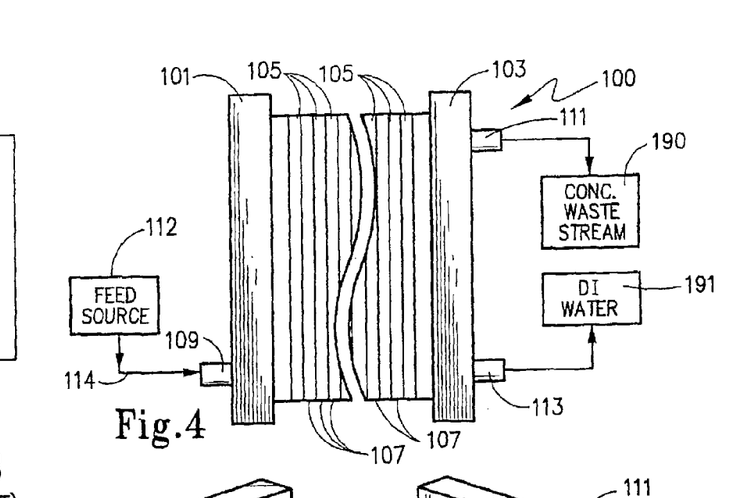
FIG. 4 is a side view in elevation of a new and useful electrophoretic electrodeionization apparatus according to the present invention.

Turning to FIG. 4, an electrophoretic electrodeionization apparatus 100 according to the present invention comprises an input endplate 101, an output endplate 103 and a plurality of alternating membranes 105 and spacers 107 sandwiched therebetween. Endplates 101 and 103 are preferably formed of a suitable structurally rigid material such as polycarbonate. Spacers 107 may be gasketed monofilament screen spacers as known in the art for use in plate-and-frame type EDI modules. Membranes 105 are various anion-selective, cation-selective and filter membranes arranged as discussed more fully hereinbelow. The input endplate 101 includes an input port 109 adapted to be placed in fluid communication with a feed source 112 operative to provide a solution 114 containing suspended and dissolved solids. The output endplate 103 includes a waste outlet port 111 and a deionized (DI) water outlet port 113. The waste outlet port 111 is operative to receive a concentrate waste stream 190 from apparatus 100, and the DI water outlet port 113 is operative to receive DI water 191 from apparatus 100. Ports 111 and 113 may be sized and adapted to fluidly communicate with selected conduits, such as waste drains and water taps, for receiving the concentrate waste stream 190 and DI water 191, respectively.

Figure 5:
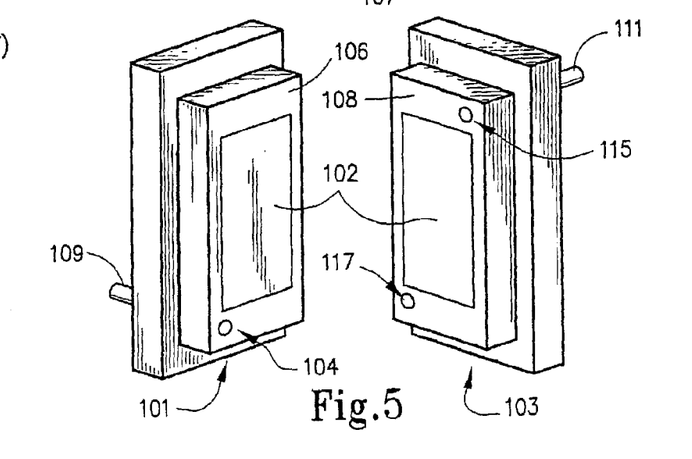
FIG. 5 is a perspective view in elevation of an input endplate and an output endplate detached from the apparatus of FIG. 4.

As shown in FIG. 5, input endplate 101 and output endplate 103 each include an electrode 102 adapted to be placed in electrical communication with a DC current source. Electrodes 102 are preferably platinum plate-type electrodes, which may be inset in endplates 101 and 103 so as to be flush with surfaces 106 and 108, respectively, of endplates 101 and 103. Input endplate 101 further includes an input aperture 104 in surface 106, such as a bore extending through endplate 101 in fluid communication with input port 109. Output endplate 103 includes a waste outlet aperture 115 and a DI water outlet aperture 117 in surface 108. Waste outlet aperture 115 is in fluid communication with waste outlet port 111, and DI water outlet aperture 117 is in fluid communication with DI water outlet port 113. It should be appreciated that various other constructions of endplates 101 and 103 are contemplated, such as shown for example in U.S. Pat. No. 4,465,573 to O'Hare.

Figure 6:
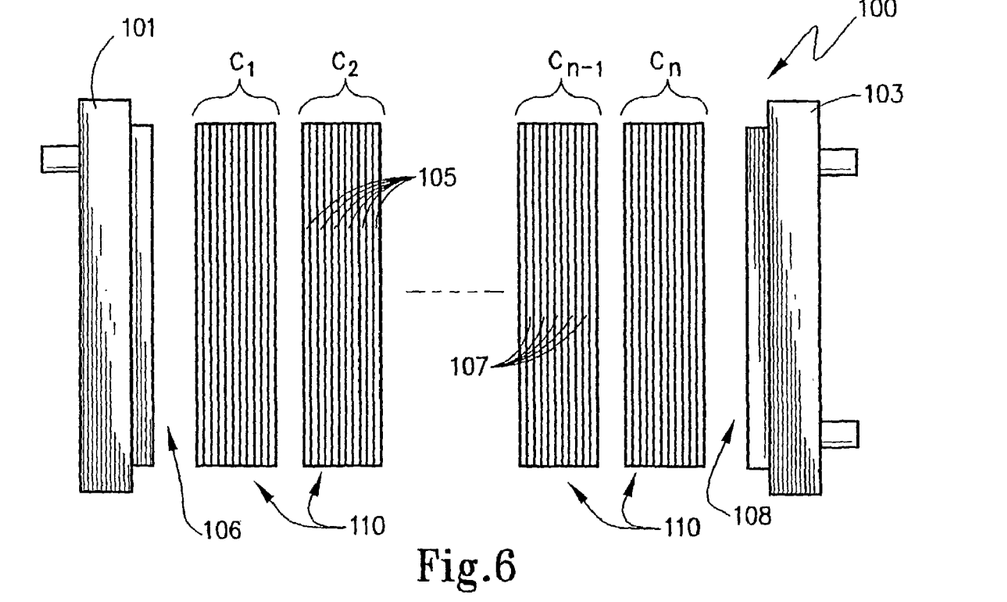
FIG. 6 is a partially exploded side view in elevation of the apparatus according to FIG. 4.

As shown in FIG. 6, apparatus 100 may include a plurality of cells 110, designated $C_1$ to $C_n$, which are sandwiched between endplates 101 and 103. Each cell 110 includes a selected number of alternating membranes 105 and spacers 107 as more fully described below. The first cell, $C_1$, is disposed adjacent surface 106 of input endplate 101, and the last cell, $C_n$, is disposed adjacent surface 108 of output endplate 103. It should be appreciated that the number of cells 110 can be varied according to the conditions of operation of apparatus 100. In particular, the number of cells can be adjusted according to the volume and/or flow rate of the feed solution, as well as according to the concentration of impurities therein. Specifically, it should be appreciated that the cells 110 of apparatus 100 may be fluidly aligned in parallel so that higher flow rates of the feed solution may be accommodated by adding more cells to the apparatus, and to further prevent the concentrate waste stream from becoming increasingly more concentrated with salts as it otherwise would if aligned in series.

Figures 7, 9:
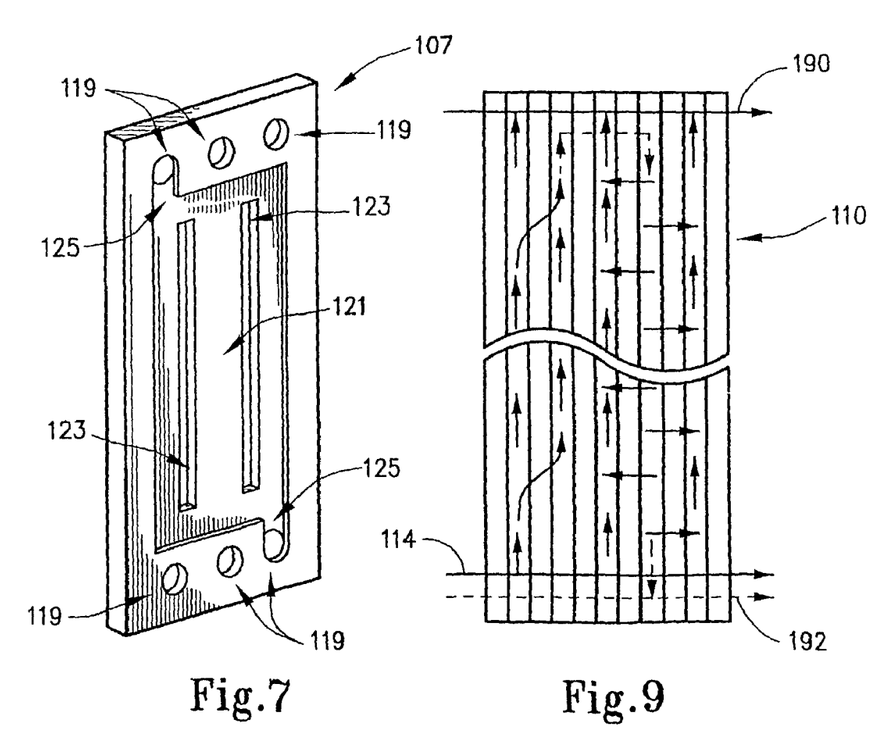
FIG. 7 is a perspective view of an exemplary spacer for use in the apparatus of the present invention.
FIG. 9 is a diagrammatic view showing the flow paths of fluid through an electrophoretic electrodeionization cell of the apparatus of FIG. 4.

An exemplary spacer 107 for use with the present invention is illustrated in FIG. 7. Spacers 107 are preferably generally rectangular in shape, although other geometric shapes are contemplated. Each spacer may include a plurality of apertures 119 and a cut-out channel 121 cut partly or fully through the thickness of spacer 107 and interconnecting various apertures 119. When cut-out channel 121 is cut only partially through spacer 107, slots 123 may further be provided through spacer 107 thereby to provide fluid communication from one side of spacer 107 to another. It should be appreciated that when a selected spacer 107 is sandwiched between two membranes 105, such as shown in FIG. 6, cut-out channel 121 forms a chamber sized and adapted to receive a selected volume of fluid. Inlet/outlet channel cut-outs 125 positioned between cut-out channel 121 and selected ones of apertures 119 permit fluid to be directed along a selected flow path through the selected ones of apertures 119 and through the chamber formed when spacer 107 is sandwiched between two membranes 105. It should be appreciated that spacers 107 may include variable numbers of apertures 119 and variations in the positioning of the inlet/outlet channel cut-outs 125, such that spacers having numerous combinations of flow paths between various apertures 119 may be formed. Additionally, the apertures 119 of adjacent spacers 107 may be aligned with one another so as to create selected flow paths between adjacent spacers.

Figure 8:
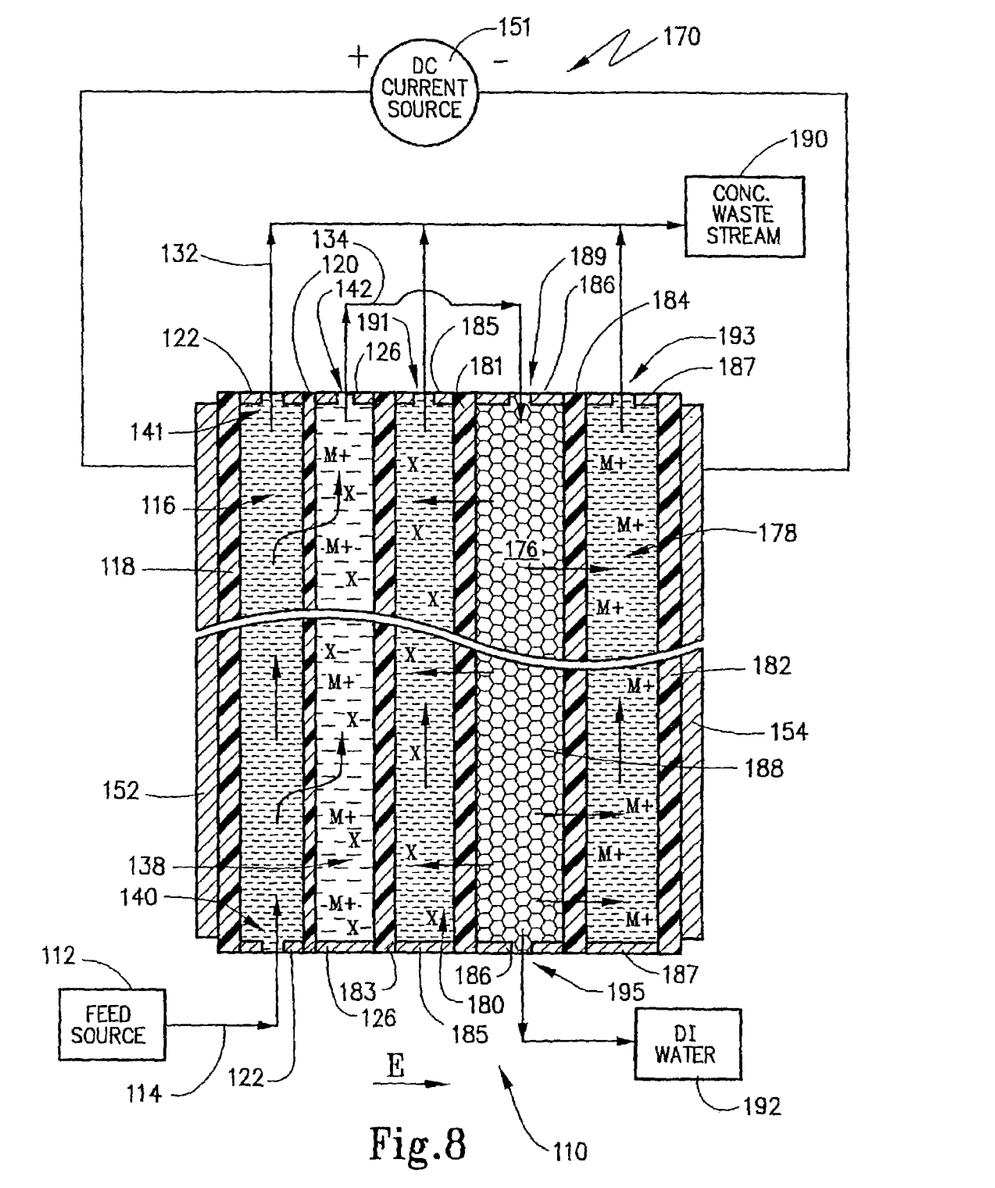
FIG. 8 is a diagrammatic cross-sectional view of an electrophoretic electrodeionization cell for use in the apparatus of FIG. 4.

An electrophoretic electrodeionization system 170 according to the present invention is illustrated in FIG. 8. System 170 includes at least one electrophoretic electrodeionization cell 110. Each cell 110 includes an inlet chamber 116, an outlet chamber 138, a diluting chamber 176, a cation concentrating chamber 178 and an anion concentrating chamber 180. One or more of cells 110 are disposed between anode 152 and cathode 154, which are in electrical communication with DC current source 151. DC current source 151 provides a DC current to the electrodes, anode 152 and cathode 154 respectively, which operate under a DC voltage potential to generate an electric field E across cell 110. While anode 152 and cathode 154 are diagrammatically shown placed immediately adjacent membranes 118 and 182, it should be appreciated that anode 152 and cathode 154 may be disposed in varying locations within a system, such as in endplates 101 and 103 astride a plurality of cells 110, as apparent with reference to FIGS. 4–6.

Inlet chamber 116 is defined on one side by a membrane 118, which is preferably a cation-selective membrane, and on an opposite side by a filter membrane 120, such as an 0.8 µm porosity microfilter, an ultrafilter or other appropriate filter for a selected particulate size distribution. Filter membrane 120 is preferably a non-polar filter membrane that allows both cations and anions to permeate therethrough. Outlet chamber 138 lies on the opposite side of filter 120 from inlet chamber 116, and is defined on one side by filter 120 and on an opposite side by cation-permeable membrane 183. The remaining sides of inlet chamber 116 and outlet chamber 138 are respectively defined by a first spacer 122 disposed between membrane 118 and filter 120 and a second spacer 126 that is disposed between filter 120 and membrane 124. Spacers 122 and 126 may be gasketed monofilament screen spacers as known in the art, and are preferably formed similarly to the construction of spacer 107 in FIG. 7.

The cation concentrating chamber 178 is disposed generally between the diluting chamber 176 and the cathode 154, and is defined on the cathode side thereof by an anion-permeable membrane 182 and on the anode side thereof by a cation-permeable membrane 184. The anion concentrating chamber 180 is disposed generally between the diluting chamber 176 and the anode 152, and is defined on the cathode side thereof by an anion-permeable membrane 181 and on the anode side thereof by the cation-permeable membrane 183. The diluting chamber 176 is disposed between the cation concentrating chamber 178 and the anion concentrating chamber 180 and is defined on the cathode side by cation-permeable membrane 184 and on the anode side by anion-permeable membrane 181. The various anion-permeable and cation-permeable membranes may be fixed to thin inert polymer frames for support, as known in the art. The remaining sides of each of chambers 180, 176 and 178 are respectively defined by third spacer 185, fourth spacer 186 and fifth spacer 187, which may be gasketed monofilament screen spacers as known in the art, and which are preferably constructed similarly to the construction of spacer 107 shown in FIG. 7. In particular, spacer 185 is sandwiched between cation-permeable membrane 183 and anion-permeable membrane 181 to define anion concentrating chamber 180. Spacer 186 is sandwiched between anion-permeable membrane 181 and cation-permeable membrane 184 to define diluting chamber 176. Spacer 187 is sandwiched between cation-permeable membrane 184 and anion-permeable membrane 182 to define cation concentrating chamber 178. Diluting chamber 176 is filled with a mixture of cation and anion exchange resins 188.

In operation, feed source 112 provides solution 114 containing suspended and dissolved solids, such as the effluent from CMP processes. Solution 114 passes through an inlet aperture 140 in spacer 122, and into inlet chamber 116 where it passes in a cross-flow direction to filter 120. Electric field E enhances the cross-flow filtration process by electrophoretically driving the generally negatively charged suspended solids particles away from the surface of the filter membrane 120 and in the direction of anode 152, thereby to suppress formation of a filter cake and maintain the efficiency of filter membrane 120. A retentate 132 is thus formed which contains particles that do not pass through filter 120, such as the suspended solids particles which electrophoretically migrate away from the surface of filter membrane 120 in the presence of electric field E. Retentate 132 flows through outlet aperture 141 in spacer 122 for collection as the concentrate waste stream 190.

Additionally, permeate 134 thus formed includes particles having a particle size smaller than the pore size of filter membrane 120, such as dissolved metal salts having cations and anions shown as M+ and X−, respectively, in outlet chamber 138. Permeate 134 is passed through outlet aperture 142 in spacer 126 and through inlet aperture 189 in spacer 186 into diluting chamber 176 where it contacts the mixture of cation and anion exchange resins 188. The unwanted cations and anions from permeate 134, shown as M+ and X− respectively, are exchanged for either hydroxyl or hydrogen ions from the resins. The cations and anions then migrate to the appropriate concentrating compartment in response to the electric field E. In particular, the anion-exchange resins in mixture 188 exchange hydroxyl ions for the anions of the dissolved salts, and the cation-exchange resins in mixture 188 exchange hydrogen ions for the cations of the dissolved salts. The DC electrical potential of electrical field E drives the ions along the surfaces of the ion-exchange resins, which are generally formed in small particles such as beads, and through the membranes into the appropriate concentrating compartment. That is, cations, shown by M+, migrate toward cathode 154 through the cation-permeable membrane 184 that defines the cathode side of diluting chamber 176. The cations are trapped by the anion-permeable membrane 182 that defines the cathode side of cation concentrating chamber 178, thereby retaining the cations M+ in the cation concentrating chamber 178. Anions, shown by X−. migrate toward anode 152 through anion-permeable membrane 181 that defines the anode side of diluting chamber 176. The anions are trapped by the cation-permeable membrane 183 that defines the anion side of anion concentrating chamber 180, thereby to retain the anions X− in the anion concentrating chamber 180. The concentrated anions and cations are then removed through outlet apertures 191 and 193 in spacers 185 and 187 respectively, and added to concentrate waste stream 190. Deionized water 192, resulting from the removal of the undesired cations and anions of the dissolved salts from permeate 134, is passed from diluting chamber 176 through outlet aperture 195 in spacer 186.

Water is split by the influence of electric field E into hydrogen and hydroxyl ions, which regenerate the mixture of ion-exchange resins 188 in diluting chamber 176, such that it is unnecessary to interrupt the water purification process to add chemicals for regeneration of the ion-exchange resins.

FIG. 9 shows an exemplary diagram of a flow path of fluid through a cell 110 according to the present invention. It should be particularly noted that feed solution 114, concentrate waste stream 190 and DI water 192 can flow entirely through cell 110 such that multiple cells can be aligned in parallel to receive feed solution 114 and produce the concentrate waste solution 190 and DI water 192 therefrom. This feature is particularly of use in adapting the present invention to variations in volume and flow rate of the feed solution, and the concentration of impurities, such as suspended and dissolved solids, therein.

Figures 10, 11:
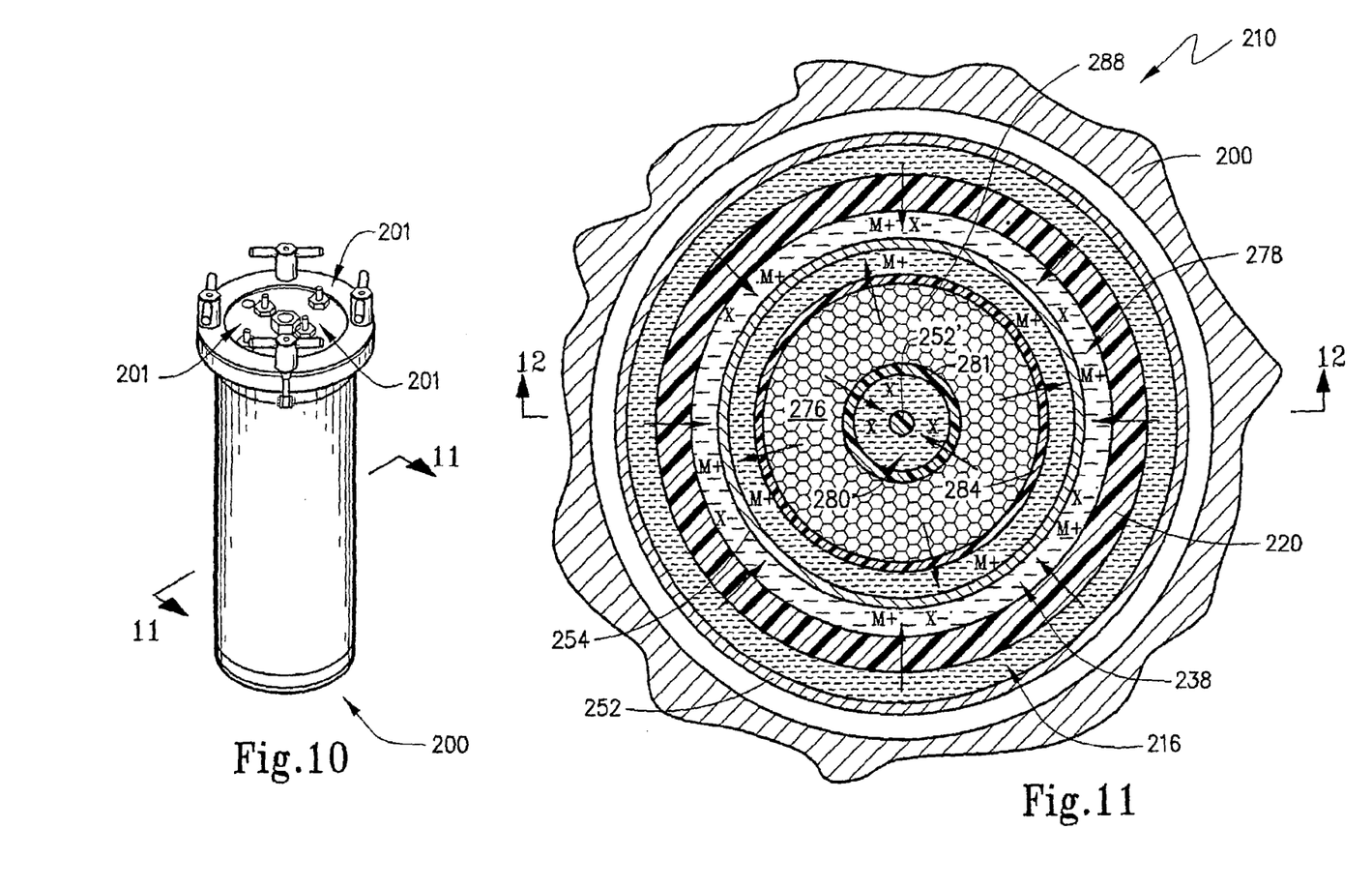
FIG. 10 is a perspective view of a cylindrical canister housing a second embodiment of the present invention.
FIG. 11 is a diagrammatic top view in cross section of the radial-flow embodiment of FIG. 10.
Figure 12:
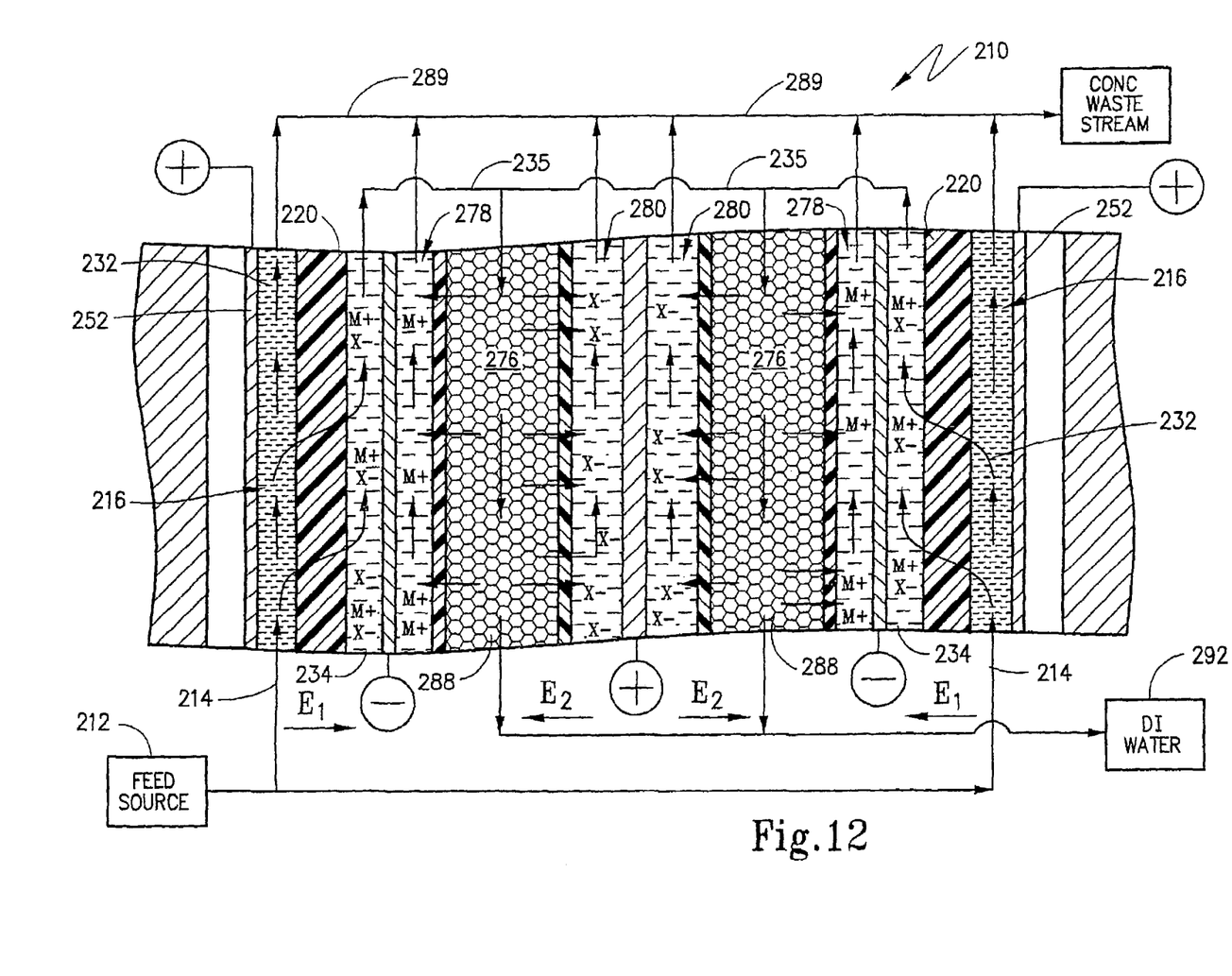
FIG. 12 is a diagrammatic cross-sectional side view of the embodiment of FIG. 10.

As shown with reference to FIGS. 10–12, a second embodiment of the present invention comprises a radial-flow configuration of an electrophoretic electrodeionization apparatus according to the present invention. As shown in FIG. 10, this embodiment may be housed in a cylindrical canister 200, such as known in the art for use with radial flow electrowinning cells and the like. Various ports 201, such as inlet and outlet ports, are provided in canister housing 200 for fluid communication with selected interior portions of the apparatus.

As shown in FIG. 11, the components of the electrophoretic electrodeionization apparatus 210 are arranged as concentric cylinders within canister housing 200. It should be noted that the wall of canister housing 200 may be of a selected thickness, as desired, and as such has been shown in partially broken-away form. The components of apparatus 210 are preferably disposed centrally within canister 200 and may be spaced apart from the inner diameter thereof as shown. It should be appreciated that the components of the electrophoretic electrodeionization apparatus 210 are generally similar to those of the plate-and-frame configuration discussed above. In particular, an outer cylindrical anode 252 and an inner cylindrical cathode 254 are provided, which are in electrical communication with an electrical current source as described above to create an electrical field. A second anode 252' is provided as a central column aligned along a longitudinal axis of canister 200, and cathode 254 together with anode 252' provide a further electrical field, as discussed below.

A filter membrane 220 is provided between anode 252 and cathode 254 which thereby defines inlet chamber 216 and outlet chamber 238 as shown. Water to be purified is provided to inlet chamber 216 through one or more inlet ports of canister 200 as discussed above with reference to FIG. 10. Anion-permeable membrane 281 and cation-permeable membrane 284 together define diluting chamber 276, which is filled with the mixture of cation and anion exchange resins 288, as discussed above. Cation-concentrating chamber 278 is thus formed between cathode 254 and cation-permeable membrane 284, and anion-concentrating chamber 280 is formed between anode 252' and anion-permeable membrane 281. Various outlet ports as discussed above with reference to FIG. 10 are in fluid communication with inlet chamber 216, anion-concentrating chamber 280 and cation-concentrating chamber 278 to collect suspended and dissolved solids, and one or more other outlet ports are in fluid communication with diluting chamber 276 to recover purified water therefrom.

As shown in FIGS. 11 and 12, radial apparatus 210 operates similarly to the plate-and-frame apparatus discussed above. Feed source 212 provides solution 214, containing suspended and dissolved solids, to the inlet chamber 216 where it passes in a cross-flow direction to filter 220. The outer electric field $E_1$ enhances the cross-flow filtration process by electrophoretically driving the suspended solids away from the surface of the filter membrane 220 and in the direction of anode 252, thereby to suppress formation of a filter cake and maintain the efficiency of filter membrane 220. Retentate 232 and permeate 234 are thus formed as described above. Permeate 234 is then passed through a conduit 235 into diluting chamber 276. In response to inner electric field $E_2$, cations M+ and anions X– from permeate 234 migrate through ion-exchange resins 288 to the cation-concentrating chamber 278 and anion-concentrating chamber 280, respectively. Concentrate waste stream conduit 289 receives suspended solids from inlet chamber 216 and receives cations and anions from chambers 278 and 280, respectively. Deionized water 292 is recovered from diluting chamber 276.

From the foregoing, it should be apparent that the present invention contemplates electrophoretic electrodeionization cells and apparatus which may be used in standard EDI type plate-and-frame module configurations or in radial-flow configurations or other configurations as apparent to the ordinarily skilled person. The present invention also contemplates a system for purifying water utilizing electrophoretic electrodeionization cells and/or apparatus according to the present invention, and a method of purifying water comprising the steps of performing electrophoretic cross-flow membrane filtration on a solution thereby to produce a permeate and a retentate and thereafter performing electrodeionization on the permeate thereby to produce purified water. It should further be appreciated that the present invention contemplates variations to the materials and structures used in forming the electrophoretic electrodeionization cells and apparatus according to the present invention. In particular, variations in the types of membranes and ion-exchange resins are contemplated, as well as in the particular materials and structures of the spacers, endplates, electrodes, ports and other components disclosed herein.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. An apparatus for use in purifying water that contains suspended and dissolved solids, comprising:
   (a) a retentate chamber sized and adapted to receive a selected volume of fluid,
      (i) said retentate chamber including an inlet adapted to be placed in fluid communication with a source of the water that contains suspended and dissolved solids;
   (b) a permeate chamber adjacent the retentate chamber and sized and adapted to receive a selected volume of fluid;
   (c) a filter membrane interposed between the retentate chamber and the permeate chamber, (i) said filter membrane operative when said inlet is in fluid communication with the source
  (A) to retain in the retentate chamber a majority of the suspended solids thereby to form in the retentate chamber a retentate containing suspended solids, and
  (B) to pass to the permeate chamber at least some of the dissolved solids thereby to form in the permeate chamber a permeate containing dissolved solids;
(d) a diluting chamber sized and adapted to receive a selected volume of said permeate,
  (i) said diluting chamber including a mixture of at least one cation exchange resin and at least one anion exchange resin disposed therein;
(e) a first conduit interconnecting said permeate chamber and said diluting chamber and operative to establish fluid communication therebetween;
(f) an outlet communicating with the diluting chamber and operative to receive deionized water therefrom;
(g) a cation concentrating chamber adjacent the diluting chamber;
(h) a cation-selective membrane interposed between the diluting chamber and the cation-concentrating chamber,
  (A) said cation-selective membrane operative to retain anions in the diluting chamber and to pass cations into the cation-concentrating chamber;
(i) an anion-concentrating chamber adjacent the diluting chamber;
(j) an anion-selective membrane interposed between the diluting chamber and the anion-concentrating chamber,
  (A) said anion-selective membrane operative to retain cations in the diluting chamber and to pass anions into the anion-concentrating chamber;
(k) a second conduit communicating with at least one of the retentate chamber, cation-concentrating chamber and anion-concentrating chamber and adapted to receive the suspended and dissolved solids therefrom;
(l) at least one cathode and anode operative to create an electric field across said retentate chamber, permeate chamber, diluting chamber, cation-concentrating chamber and anion-concentrating chamber; and
(m) wherein said chamber are formed by a plurality of alternating membranes and spacers.

2. An apparatus according to claim 1 wherein said spacers are gasketed monofilament screen spacers.

3. An apparatus according to claim 1 wherein said alternating membranes and spacers are sandwiched between an input endplate and an output endplate, where said input and output endplates each include an electrode adapted to be placed in electrical communication with an electrical current source.

4. An apparatus according to claim 1 wherein said diluting chamber is defined by a spacer sandwiched between said anion-selective membrane and said cation-selective membrane.

5. An apparatus according to claim 1 wherein the retentate chamber and permeate chamber are each defined by a spacer sandwiched between the filter membrane and a cation-selective membrane.

6. An apparatus according to claim 1 wherein the cation-concentrating chamber and the anion-concentrating chamber are each defined by a spacer sandwiched between a cation-selective membrane and an anion-selective membrane.

7. An apparatus according to claim 1 wherein said anode, cathode, filter membrane, cation-selective membrane and anion-selective membrane are configured as concentric cylinders, and including a second anode disposed along a longitudinal axis of said cylinders.

8. An apparatus according to claim 7 wherein said filter membrane is disposed radially inwardly from said anode thereby to define said retentate chamber therebetween.

9. An apparatus according to claim 8 wherein said cathode is disposed radially inwardly from said filter membrane thereby to define said permeate chamber therebetween.

10. An apparatus according to claim 9 wherein said cation-selective membrane is disposed radially inwardly from said cathode thereby to define said cation-concentrating chamber therebetween.

11. An apparatus according to claim 10 wherein said anion-selective membrane is disposed radially between said cation-selective membrane and said second anode thereby to define said diluting chamber between said anion-selective membrane and said cation-selective membrane and to define said anion-concentrating chamber between said anion-selective membrane and said second anode.

* * * * *